(12) United States Patent
Raynaud et al.

(10) Patent No.: US 10,261,510 B2
(45) Date of Patent: Apr. 16, 2019

(54) ASSEMBLY FOR THE FLIGHT MANAGEMENT OF AN AIRCRAFT AND METHOD FOR MONITORING GUIDANCE INSTRUCTIONS FOR SUCH AN ASSEMBLY

(71) Applicant: Airbus Operations S.A.S., Toulouse (FR)

(72) Inventors: Sylvain Raynaud, Cornebarrieu (FR); Jean-Claude Mere, Verfeil (FR); Simon Sellem, Paris (FR)

(73) Assignee: Airbus Operations S.A.S. (FR)

( * ) Notice: Subject to any disclaimer, the term of this patent is extended or adjusted under 35 U.S.C. 154(b) by 0 days.

(21) Appl. No.: 15/781,932

(22) PCT Filed: Nov. 24, 2016

(86) PCT No.: PCT/EP2016/078645
§ 371 (c)(1),
(2) Date: Jun. 6, 2018

(87) PCT Pub. No.: WO2017/097595
PCT Pub. Date: Jun. 15, 2017

(65) Prior Publication Data
US 2018/0275655 A1 Sep. 27, 2018

(30) Foreign Application Priority Data
Dec. 8, 2015 (FR) ...................... 15 62024

(51) Int. Cl.
*G05D 1/00* (2006.01)
*G01C 23/00* (2006.01)
(Continued)

(52) U.S. Cl.
CPC ........... *G05D 1/0077* (2013.01); *B64C 13/18* (2013.01); *G01C 23/00* (2013.01); *G01C 23/005* (2013.01);
(Continued)

(58) Field of Classification Search
CPC ........ G05D 1/00; G05D 1/0077; G05D 1/101; B64C 13/00; B64C 13/18; G08G 5/00;
(Continued)

(56) References Cited

U.S. PATENT DOCUMENTS 9,139,289 B2     9/2015  Raynaud et al.
9,741,252 B2 *   8/2017  Mere ................. B64C 13/18
(Continued)

FOREIGN PATENT DOCUMENTS

EP    1273987 A2    1/2003
FR    2983598 A1    6/2013

OTHER PUBLICATIONS

International Search Report for PCT/EP2016/078645 dated Mar. 6, 2017.
Written Opinion for PCT/EP2016/078645 dated Mar. 6, 2017.

*Primary Examiner* — Yonel Beaulieu
(74) *Attorney, Agent, or Firm* — Lerner, David, Littenberg, Krumholz & Mentlik, LLP

(57) ABSTRACT

The invention relates to a flight management assembly (1) comprising two guidance chains (2A, 2B), each one provided with a flight management system (3A, 3B), each of said flight management systems (3A, 3B) carrying out at least one calculation of guidance instructions for the aircraft, the flight management assembly (1) also comprising at least one monitoring unit (4A, 4B) designed to monitor the guidance instructions calculated by the two flight management systems (3A, 3B) in such a way as to be able to detect and identify a defective flight management system, the monitoring unit (4A, 4B) comprising a monitoring device (5) which verifies particularly whether the following three conditions are met: a first derivative of extrapolated cross tracks is positive; a second derivative of extrapolated cross tracks is positive; and extrapolated positions of the aircraft (Continued)

are on the same side of an active segment of the flight plan followed by the aircraft as the current position of the aircraft.

12 Claims, 2 Drawing Sheets

(51) Int. Cl.
  *B64C 13/00* (2006.01)
  *B64C 13/18* (2006.01)
  *G08G 5/00* (2006.01)
  *G05D 1/10* (2006.01)
(52) U.S. Cl.
  CPC ........... *G05D 1/101* (2013.01); *G08G 5/0034* (2013.01); *G08G 5/0047* (2013.01)
(58) Field of Classification Search
  CPC .... G08G 5/0034; G08G 5/0047; G01C 23/00; G01C 23/005
  See application file for complete search history.

(56) References Cited

U.S. PATENT DOCUMENTS

| | | | |
|---|---|---|---|
| 9,922,568 B2* | 3/2018 | Raynaud | G05D 1/0077 |
| 2003/0195672 A1* | 10/2003 | He | G01C 23/00 |
| | | | 701/3 |
| 2007/0299568 A1* | 12/2007 | Rouquette | G05D 1/0077 |
| | | | 701/3 |
| 2009/0259351 A1* | 10/2009 | Wachenheim | G05D 1/0202 |
| | | | 701/7 |
| 2011/0060483 A1* | 3/2011 | Gine I Cortiella | G01C 23/005 |
| | | | 701/3 |
| 2011/0276199 A1* | 11/2011 | Brot | G05D 1/0077 |
| | | | 701/3 |
| 2012/0173052 A1* | 7/2012 | Nicolas | G05D 1/0077 |
| | | | 701/3 |
| 2012/0253564 A1* | 10/2012 | Noll | G06F 3/1423 |
| | | | 701/14 |
| 2013/0245862 A1 | 9/2013 | Putz et al. | |

* cited by examiner

ASSEMBLY FOR THE FLIGHT MANAGEMENT OF AN AIRCRAFT AND METHOD FOR MONITORING GUIDANCE INSTRUCTIONS FOR SUCH AN ASSEMBLY

CROSS-REFERENCE TO RELATED APPLICATIONS

The present application is a national phase entry under 35 U.S.C. § 371 of International Application No. PCT/EP2016/078645 filed Nov. 24, 2016, published in French, which claims priority from French Patent Application No. 1562024 filed Dec. 8, 2015, all of which are incorporated herein by reference.

TECHNICAL FIELD

The present invention relates to a flight management unit for an aircraft, in particular a transport aircraft, and to a method for monitoring guidance instructions generated by such a flight management unit.

More specifically, but not exclusively, the present invention is applicable to an aircraft implementing RNP AR "Required Navigation Performance with Authorization Required" type operations. These RNP AR operations are based on surface navigation of the RNAV (aRea NAVigation) type and on RNP "Required Navigation Performance" type operations. They have the specific feature of requiring special authorization in order to be able to be implemented on an aircraft.

It is known that the RNP concept corresponds to surface navigation, for which monitoring and warning means are added (on board the aircraft) that make it possible to ensure that the aircraft remains inside a corridor, called RNP, around a reference path. Topography or other aircraft are potentially located outside this corridor. The required performance for an RNP operation type is defined by an RNP value that represents the half-width (in nautical miles: NM) of the corridor around the reference path, inside which the aircraft must remain for 95% of the time during the operation. A second corridor (around the reference path) with a half-width that is twice the RNP value is also defined. The probability of the aircraft leaving this second corridor must be less than $10^{-7}$ per flight hour.

The concept of RNP AR operations is even more stringent. Indeed, the RNP AR procedures are characterized by:
RNP values:
  that are less than or equal to 0.3 NM on approach and that can go down to 0.1 NM; and
  that are strictly less than 1 NM on departure and during a go-around and that can also go down to 0.1 NM;
a final approach segment that can be curved; and
obstacles (mountains, traffic, etc.) that can be located at twice the RNP value relative to the reference path, whereas for the common RNP operations an additional margin relative to the obstacles is provided.

The air authorities have defined a "Target Level of Safety" TLS of $10^{-7}$ per flight hour. In the case of RNP AR operations, as the RNP values can go down to 0.1 NM and the obstacles can be located at twice the RNP value of the reference path, this target is expressed by a probability of the aircraft leaving the half-width corridor D=2.RNP that must not exceed $10^{-7}$ per flight hour.

The present invention is applicable to a flight management unit comprising two guidance chains each provided with a Flight Management System (FMS).

PRIOR ART

The equipment on board an aircraft, and particularly the flight management unit, must allow the target level of safety to be achieved if the aircraft must implement required navigation performance with authorization required operations of the RNP AR type.

The aim is to have the ability to fly the RNP AR procedures with RNP values that go down to 0.1 NM, without restrictions (in a normal situation and in the event of a failure) on departure, approach and go-around.

However, in order for an aircraft to have the ability to fly such RNP AR procedures, an erroneous source of computing guidance orders (or instructions) particularly needs to be able to be eliminated from the guidance circuit in order to counter the possible effects thereof on the path of the aircraft.

In order to be able to implement an operation of the RNP 0.1 type, the flight management unit must make it possible to comply with a "hazardous" type severity level in the event of the loss of or error in the guidance instructions. Furthermore, it is essential that, in the event of the detection of an erroneous computation, particularly of a guidance instruction or order (such as a roll command order), the aircraft can continue to be guided in automatic mode in order to be maintained in the RNP corridor.

With a flight management unit with two flight management systems, in the event of a discrepancy between the two flight management systems, the unit is not capable of identifying which system is defective, and the aircraft therefore no longer can be guided in automatic mode and is not able to implement such RNP operations.

DISCLOSURE OF THE INVENTION

The aim of the present invention is to overcome this disadvantage. It relates to a method for monitoring at least one guidance instruction provided by a flight management unit, said flight management unit comprising two guidance chains each provided with a flight management system, each of said flight management systems being configured to compute at least one guidance instruction for the aircraft.

According to the invention the method comprises the following successive steps:
a reception step, implemented by a reception unit, consisting in receiving a guidance instruction to be monitored and at least one current position of the aircraft, the guidance instruction to be monitored representing the guidance instruction computed by one of said flight management systems;
a first computation step, implemented by a first computation unit, consisting in computing a plurality of positions, called extrapolated positions, of the aircraft, at least on the basis of said guidance instruction and said current position of the aircraft;
a second computation step, implemented by a computation unit, consisting in computing track deviations, called extrapolated deviations, corresponding to deviations of said extrapolated positions relative to an active segment of a flight plan followed by the aircraft; and
an analysis step, implemented by an analysis unit, consisting in analyzing the extrapolated track deviations to determine whether the guidance instruction is correct or incorrect, the analysis step comprising a main sub-step consisting in:
  verifying whether the following three conditions are met:

a first drift of the extrapolated track deviations is positive;
a second drift of the extrapolated track deviations is positive; and
the extrapolated positions are located on the same side of the active segment as the current position of the aircraft; and
concluding that the guidance instruction is incorrect if these three conditions are simultaneously met.

The method provides for determining whether the guidance instruction is correct or incorrect. The term "correct" herein denotes a guidance instruction that allows the aircraft to be converged toward the active segment of the flight plan. The term "incorrect" herein denotes a guidance instruction that does not allow the aircraft to be converged toward the active segment of the flight plan.

Thus, the monitoring method is capable of detecting an incorrect guidance instruction (or order) and of thus identifying a defective flight management system (namely, that which computed this incorrect guidance instruction) in order to allow the aircraft to be guided using a non-defective flight management system, which, as specified below, allows the aircraft to have the ability to fly operations of the RNP type as described above, and to overcome the aforementioned disadvantage.

Advantageously, the analysis step comprises a first auxiliary sub-step consisting in, during a transition between a first and a second successive active segment:
verifying whether at least one of the following two conditions is met:
the drift of a current roll angle and the drift of a target roll angle have the same sign, the target roll angle being the sum of a nominal roll angle and a corrective term depending on the track deviation, the nominal roll angle being a roll angle relative to a segment of the current flight plan;
the target roll angle being different from the nominal roll angle and the difference between the target roll angle and the nominal roll angle not varying, the current roll angle of the aircraft varies; and
concluding that the guidance instruction is incorrect if one of these two conditions is met.

In addition, advantageously, the analysis step comprises a second auxiliary sub-step consisting in, during a transition between a first and a second successive active segment of the straight type:
verifying whether the following condition is met: the track deviation relative to the second segment extrapolated at an extrapolation time does not decrease, the extrapolation time corresponding to an estimated time to the transition; and
concluding that the guidance instruction is incorrect if this condition is met.

Moreover, advantageously, the analysis step comprises a third auxiliary sub-step consisting in, during a transition between a first and a second successive active segment of the straight type:
verifying whether the following condition is met: a speed vector of the aircraft is not orthogonal to a radius vector;
concluding that the guidance instruction is incorrect if this condition is met.

Furthermore, advantageously, the analysis step comprises a fourth auxiliary sub-step consisting in, during a transition between a first and a second successive active segment of the straight type:
verifying whether the following condition is met: the aircraft is not flying inside a containment zone depending on said first and second active segments;
concluding that the guidance instruction is incorrect if this condition is met.

Moreover, advantageously, the analysis step comprises a fifth auxiliary sub-step consisting in:
verifying whether the following two conditions are met:
conditions indicating that the guidance instruction is incorrect have been met at least during a predetermined number of successive processing operations; and
the extrapolated track deviation is greater than a predetermined value; and
concluding that the guidance instruction is incorrect only if these two conditions are simultaneously met.

Furthermore, advantageously, the first computation step (of extrapolated positions) consists in computing an extrapolated position of the aircraft using the following data:
the values of parameters of the aircraft, including at least the current position, previously confirmed, showing the status of the aircraft;
a roll order representing the guidance instruction to be monitored;
the current value of at least one atmospheric parameter; and
a performance model of the aircraft.

The present invention further relates to a device for monitoring at least one guidance instruction (or order) provided (or generated) by a flight management unit as described above.

According to the invention, said monitoring device comprises:
a reception unit configured to receive a guidance instruction to be monitored and at least one current position of the aircraft, the guidance instruction to be monitored representing the guidance instruction computed by one of said flight management systems;
a first computation unit configured to compute a plurality of positions, called extrapolated positions, of the aircraft, at least on the basis of said guidance instruction and said current position of the aircraft;
a second computation unit configured to compute track deviations, called extrapolated deviations, corresponding to deviations of said extrapolated positions relative to an active segment of a flight plan followed by the aircraft; and
an analysis unit configured to analyze extrapolated track deviations in order to determine whether the guidance instruction is correct or incorrect, the analysis unit comprising a main analysis module configured to:
verify whether the following three conditions are met:
a first drift of the extrapolated track deviations is positive;
a second drift of the extrapolated track deviations is positive; and
the extrapolated positions are located on the same side of the active segment as the current position of the aircraft; and
conclude that the guidance instruction is incorrect if these three conditions are simultaneously met.

Advantageously, the analysis unit comprises at least one auxiliary analysis module and preferably a plurality of auxiliary analysis modules for implementing at least some of the aforementioned auxiliary analysis sub-steps.

The present invention further relates to an aircraft, in particular a transport aircraft, that is provided with a monitoring device and/or a flight management unit as described above.

BRIEF DESCRIPTION OF THE FIGURES

The appended figures provide an understanding of the way the invention can be produced. In these figures, identical references denote similar elements. More specifically.

DETAILED DESCRIPTION

Figure 1:
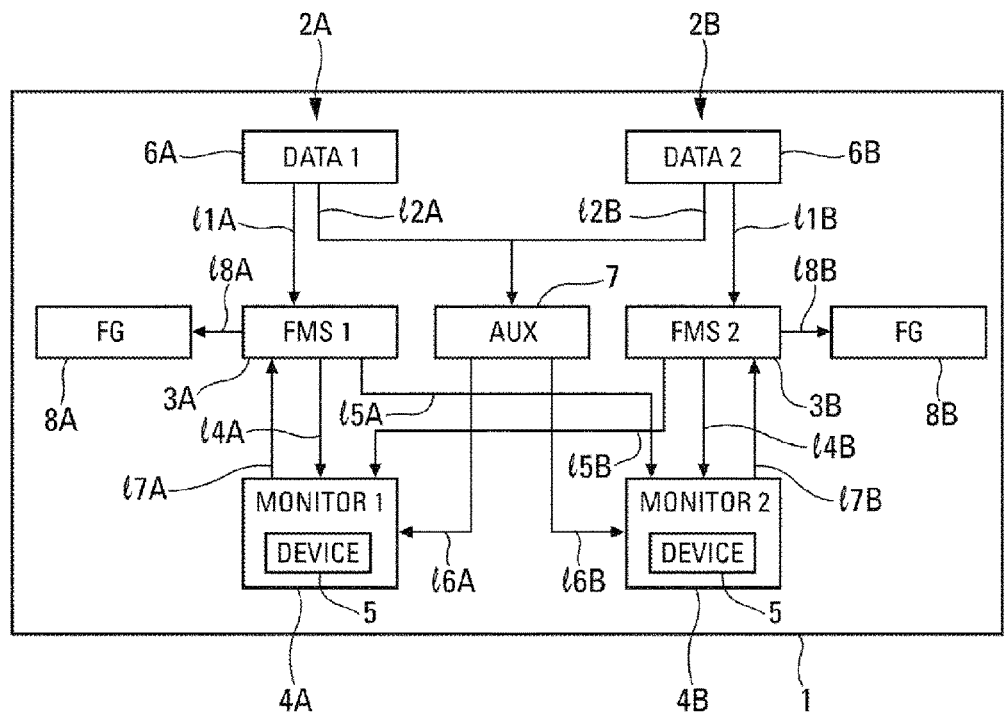
FIG. 1 is a block diagram of a particular embodiment of a flight management unit for an aircraft.

FIG. 1 schematically shows a flight management unit 1 for an aircraft, in particular a transport aircraft, that allows the invention to be illustrated.

This flight management unit 1, which is on board the aircraft, comprises two guidance chains 2A and 2B each provided with a flight management system (FMS) 3A and 3B. The two flight management systems 3A and 3B ("FMS1" and "FMS2") are independent and are housed in different hardware.

Each of said flight management systems 3A and 3B is configured to carry out the computations specified below, and particularly a computation of guidance instructions for the aircraft.

The aircraft is guided according to data (and particularly the guidance instructions) provided by only one of said two guidance chains 2A and 2B, called active guidance chain.

Said flight management unit 1 also comprises at least one monitoring unit 4A and 4B ("MONITOR 1, 2") configured to monitor data generated by the flight management systems 3A and 3B.

The monitoring unit 4A, 4B is housed in different hardware from the hardware housing the two flight management systems 3A and 3B. The monitoring unit 4A, 4B is configured to monitor guidance instructions (or orders) computed by the two flight management systems 3A and 3B in order to be able to detect and identify, where necessary, a defective flight management system from among the flight management systems 3A and 3B, as specified below.

A defective flight management system is understood to be a flight management system that computes and transmits at least one erroneous (or incorrect) guidance instruction.

To this end, the monitoring unit 4A, 4B comprises a monitoring device 5 ("DEVICE").

Figure 2:
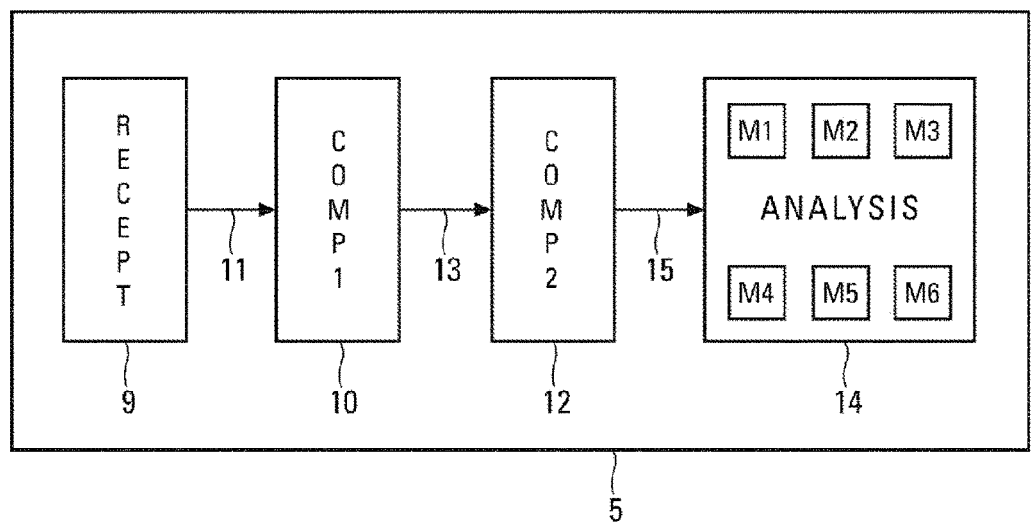
FIG. 2 is a block diagram of a particular embodiment of a monitoring device according to the invention.

According to the invention, said monitoring device 5 comprises, as shown in FIG. 2:

a reception unit 9 ("RECEPT") configured to receive a guidance instruction to be monitored and at least the current position of the aircraft, the guidance instruction to be monitored representing the guidance instruction computed by one of said flight management systems 3A, 3B;

a computation unit 10 ("COMP 1"), which is connected to the reception unit 9 by means of a link 11 and is configured to compute a plurality of positions P1 to P4, called extrapolated positions, of the aircraft AC (FIG. 3), at least on the basis of said guidance instruction and said current position P0 of the aircraft AC;

a computation unit 12 ("COMP 2"), which is connected to the computation unit 10 by means of a link 13 and is configured to compute track deviations E1 to E4, called extrapolated deviations, corresponding to deviations of said extrapolated positions P1 to P4 relative to an active segment SA of a flight plan followed by the aircraft AC (FIG. 3); and an analysis unit 14 ("ANALYSIS"), which is connected to the computation unit 12 by means of a link 15 and is configured to analyze extrapolated track deviations E1 to E4 in order to determine whether the guidance instruction is correct or incorrect.

In a particular embodiment, a plurality of successive durations is considered for computing the extrapolated positions P1 to P4.

However, in a preferred embodiment, with the extrapolation of the position being based on the instruction only (the position of the aircraft is extrapolated as if instantaneously transitioning from the current roll to the value of the instruction), the aircraft dynamics are not involved, and extrapolation is not necessary on a plurality of time horizons for a given instruction. In this preferred embodiment, the temporal evolution of the extrapolation of the position simply needs to be analyzed for a single time horizon. This time horizon is precisely defined for optimal detection (and preferably is configurable).

According to the invention, the analysis unit 14 comprises a main analysis module M1 configured:

to verify whether the following three conditions are met:
  a first drift of the track deviations E1 to E4 is positive;
  a second drift of the track deviations E1 to E4 is positive; and
  the extrapolated positions P1 to P4 are located on the same side of the active segment SA (which can be a straight segment or a curved (or curvilinear) segment) as the current position P0 of the aircraft AC; and to conclude that the guidance instruction is incorrect if these three conditions are simultaneously met.

Indeed, the extrapolated track deviations must increase (first positive drift) to ensure the existence of a divergence. Similarly, the drift of these extrapolated track deviations must increase (second positive drift) in order to be certain that the flight management system is not in the process of correcting the divergence. Furthermore, if the third condition is not met, the track deviation will cancel out and the aircraft will converge toward the active (or current) segment.

The monitoring device 5 of the monitoring unit 4A, 4B is thus capable of isolating a defective flight management system in order to allow the crew to carry out an RNP operation with an acceptable response time.

In a particular embodiment, the monitoring unit 4A, 4B is configured:

to compute the difference between a guidance instruction computed by one of said flight management systems 3A and 3B and a corresponding guidance instruction computed by the other one of said flight management systems 3A and 3B and to compare this difference with a predetermined margin; and if said difference is greater than said margin, to carry out a coherence verification by analyzing the evolutions of the extrapolations of the position of the aircraft, deduced from the respective guidance instructions, in order to be able to detect an incoherent (i.e. erroneous) guidance instruction and to thus detect the defective system as being the flight management system that computed this incoherent guidance instruction.

In a preferred embodiment, shown in FIG. 1, the flight management unit 1 comprises two monitoring units 4A and 4B, which are configured to carry out the same monitoring operations and each one of which is provided with a monitoring device 5. This nevertheless allows, in the event of the failure of one of these monitoring units 4A and 4B in RNP operation, a defective flight management system 3A or 3B to be detected, where necessary, and thus the integrity required for this type of RNP operation to be ensured.

Furthermore, the flight management unit 1 comprises switching means configured, in the event of the detection of a defective flight management system (for example, the flight management system 3A) by the monitoring unit 4A, 4B and if the active guidance chain is that which comprises this defective flight management system (the guidance chain 2A in this example), to implement switching consisting in activating the other one of said two guidance chains 2A and 2B (namely, the guidance chain 2B in this example).

Furthermore, in a preferred embodiment, the analysis unit 14 of the monitoring device 5 comprises an auxiliary analysis module M2 configured to:

make it possible to verify whether at least one of the two following conditions (during a transition of the TF-TF type between a first and a second successive straight segment) is met:
  c1) the drift of a current roll angle (i.e. the effective roll angle of the aircraft at the current instant) and the drift of a target roll angle (generated by a flight management system) have the same sign, the target roll angle being the sum of a nominal roll angle and a corrective term depending on the track deviation, the nominal roll angle being a roll angle relative to a considered segment of the current flight plan;
  c2) the target roll angle being different from the nominal roll angle and the difference between the target roll angle and the nominal roll angle not varying, the current roll angle of the aircraft varies; and
concluding that the guidance instruction is incorrect if one of these two conditions is met.

The two analysis modules M1 and M2 are permanently active during the implementation of the monitoring carried out by the monitoring device 5.

The purpose of the auxiliary analysis module M2 is to prevent false alarms during the Roll Anticipation Distance (RAD). As the nominal roll angle changes directly from one flight plan segment to the next segment and as the aircraft dynamics (generally a roll rate of approximately 3°/s) limit the ability to follow the nominal roll angle, each turn must be anticipated in order to follow the path in the best possible manner.

Due to a maximum permissible roll rate for the aircraft, it is not possible for the new roll command to be instantaneously obtained for each sequencing of a segment. During the RAD distance, the aircraft has not yet sequenced the current segment, but the nominal roll angle is that of the next segment.

For this reason, while flying according to the RAD distance, the track deviation necessarily will increase and additional verifications must be carried out, based on the fact that, during the RAD distance, the target roll angle of the flight management system diverges from the current segment (to anticipate convergence toward the next segment), but, as the track deviation and the Track Angle Error (TAE) increase, the target roll angle tends to bring the aircraft back on the path and thus the drift of the target roll angle of the flight management system is, under normal conditions, the opposite of the drift of the current roll angle.

Therefore, a failure is detected if the drifts of the target roll angle and the current roll angle have the same sign (aforementioned condition c1) or, if the target roll angle is constant and differs from the nominal roll angle, the drift of the current roll angle is not zero (aforementioned condition c2).

It is to be noted that, if the target roll angle differs from the nominal roll angle (track deviation to be absorbed) and the difference between the two values (target roll angle and nominal roll angle), proportional to the track deviation to be absorbed, does not vary, while the current roll angle of the aircraft varies, the command is fixed.

Condition c2 is required to detect the particular case of an erroneous command fixed at the output of the flight management system 3A, 3B, which case cannot be detected under condition c1.

Figure 4:
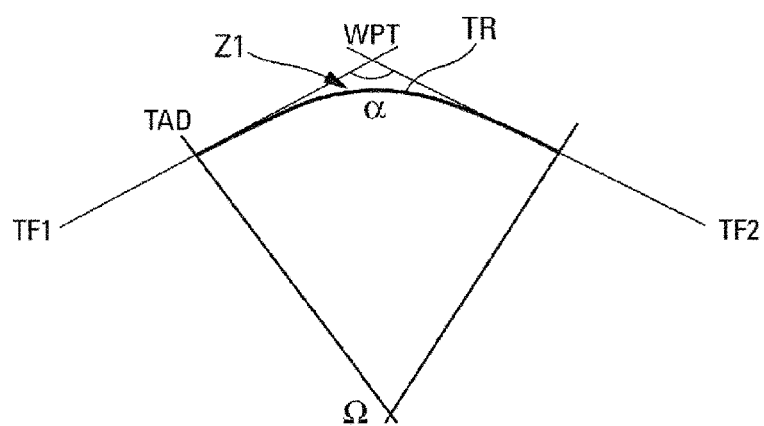
FIGS. 4 and 5 are graphical representations showing a transition between two successive straight segments of a flight plan, allowing the implementation of two different monitoring operations to be explained.

Furthermore, conventionally, when the existence of two straight consecutive segments TF1 and TF2 is detected, as shown in FIG. 4, the flight management system recomputes a curved ("curvilinear") transition segment TR to avoid flying over the waypoint WPT at the junction of these two straight segments TF1 and TF2.

The transition is recomputed on the basis of the current status of the aircraft (ground speed, position) and the change of heading. The change of heading is the angle between the direction of the two straight segments TF1 and TF2, namely $\pi - \alpha$, with $\alpha$ being the angle between the two straight segments TF1 and TF2.

For such TF-TF transitions (such as TF1-TF2 in FIG. 4), the reference segment used by the monitoring device 5 (namely, the segment TF1 of the consolidated flight plan) differs from the reference segment of the path recomputed by the flight management system (segment TR).

Thus, if the aircraft AC is outside the segment TF1 or inside the curved segment TR, computed by the flight management system, the monitoring device 5 will detect a divergence relative to the path with the preceding conditions.

Each time the aircraft flies inside the zone between the segment TR, recomputed by the flight management system, and the section TF-TF of the flight plan (zone Z1 in FIG. 4), a normal control situation, consisting in diverting the aircraft from the flight plan to converge toward the segment TR, will be detected as erroneous.

The analysis unit 14 comprises various auxiliary analysis modules M3, M4 and M5 allowing monitoring to be carried out to prevent such false alarms.

Various monitoring operations are possible by taking into account:
  a) either conditions based on the detection of a Turn Anticipation Distance (TAD) carried out by analyzing the variation in the instantaneous track deviation and implemented by auxiliary analysis modules M3 and M4 specified hereafter;
  b) or a containment zone based on the size of the segments (with a fixed value, which is easy to find from a navigation database), implemented by the auxiliary analysis module M5. This monitoring implemented by the auxiliary analysis module M5 is less accurate than the two monitoring operations implemented by the auxiliary analysis modules M3 and M4, but it is sufficient, robust and independent of the flight management systems.

The analyses and monitoring operations implemented for the auxiliary analysis modules M3 and M4 are based on a potential turn anticipation distance TAD and are highly sensitive to small variations in this zone.

To this end, in a first time-based embodiment, the analysis unit 14 comprises the auxiliary analysis module M4, which is configured, during a transition between a first TF1 and a second TF2 successive and straight active segment, to:

verify whether the following condition is met: the extrapolated track deviation relative to the segment TF2 up to the transition between the two segments TF1 and TF2 at an extrapolation time $T_{ex}$ does not decrease, said extrapolation time $T_{ex}$ corresponding to an estimated time up to the transition between the two segments TF1 and TF2; and conclude that the guidance instruction is incorrect if this condition is met (namely, if the extrapolated track deviation does not decrease as it should).

This monitoring thus consists in testing the variations in the track deviation on the basis of the instant of the extrapolation time $T_{ex}$.

Furthermore, a second embodiment is based on the center of rotation Ω (FIG. 4), which is determined on the basis of the turn anticipation distance TAD estimated by analyzing the variation of the instantaneous track deviation.

In this second embodiment, the analysis unit 14 comprises an auxiliary analysis module M5 configured, during a transition between a first TF1 and a second TF2 successive and straight active segment, to:

verify whether the following condition is met: the speed vector of the aircraft is not orthogonal to the radius vector (passing through the center Ω of the segment TR having an arc of a circle, and the position of the aircraft);

conclude that the guidance instruction is incorrect if this condition is met (the speed vector of the aircraft is not orthogonal to the radius vector).

In this second embodiment, the start of the analysis is the same as that of the first embodiment, but an estimated center Ω of the theoretical curve transition (TR) is computed on the basis of the estimated TAD distance, and a scalar product is used to detect a problem.

Figure 5:
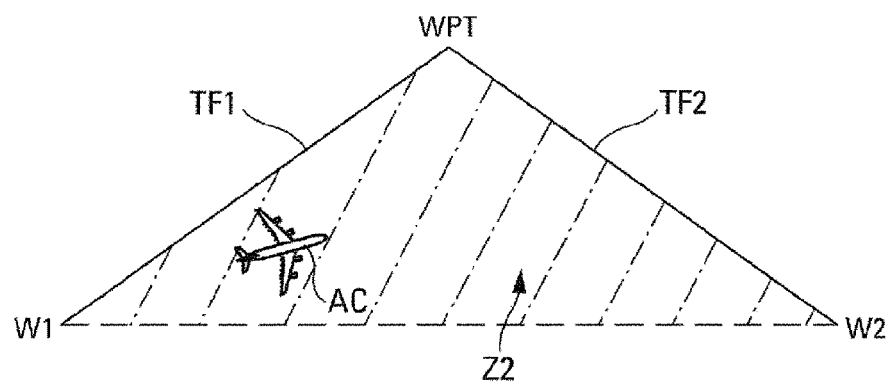

Furthermore, the analysis unit 14 comprises an auxiliary analysis module M5 configured, during a transition between two successive and straight active segments TF1 and TF2, to:

verify whether the following condition is met: the aircraft does not fly inside a containment zone Z2 (hatched area in FIG. 5) dependent on said active segments TF1 and TF2. The active segments TF1 and TF2 are defined by straight segments between waypoints W1 and WPT and between waypoints WPT and W2, respectively. The containment zone Z2 is a triangle having the waypoints W1, WPT and W2 as vertices, respectively; and conclude that the guidance instruction is incorrect if the aforementioned condition is met.

The waypoints W1 and W2 are defined as a function of the configuration of the flight plan.

Furthermore, in a particular embodiment, the analysis unit 14 comprises an auxiliary analysis module M6 configured to:

verify whether the following two conditions are met:
  conditions indicating that the guidance instruction is incorrect have been met at least during a predetermined number of successive processing operations; and
  the extrapolated track deviation is greater than a predetermined value; and
conclude that the guidance instruction is incorrect only if these two conditions are simultaneously met.

Figure 3:
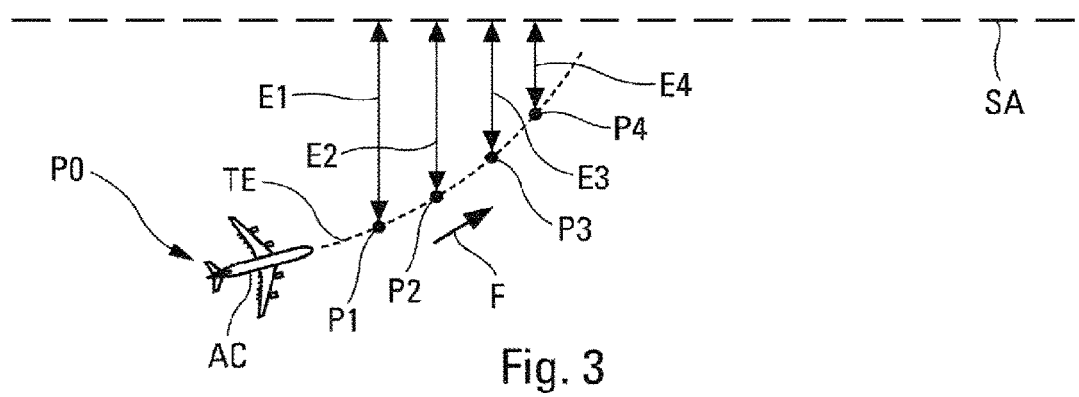
FIG. 3 is a diagram showing an aircraft flying along an extrapolated path and which highlights track deviations relative to an active segment of a flight plan.

The monitoring device 5, as described above, implements the following successive steps ET1 to ET3:

a computation step ET1 for computing, on the basis of the guidance instruction to be monitored, a plurality of positions P1, P2, P3 and P4, called extrapolated positions, of the aircraft AC, as shown in FIG. 3, for durations provided on the basis of the current instant;

a computation step ET2 for computing track deviations E1, E2, E3, E4, called extrapolated deviations, respectively corresponding to deviations of the extrapolated positions P1, P2, P3, P4 of the aircraft AC, which form an extrapolated path TE (the flight direction of which is shown by an arrow F in FIG. 3) relative to an active segment SA of the flight plan (FIG. 3); and an analysis step ET3 for analyzing extrapolated track deviations E1 to E4 in order to determine whether they diverge or converge (relative to the active segment SA), in order to be able to determine whether or not the guidance instruction is correct, the flight management system 3A, 3B in principle computing a guidance instruction intended to cause the aircraft to converge toward the active segment SA.

Thus, a method (implemented by the flight management unit 1) is obtained for monitoring guidance instructions output from a flight management system 3A, 3B that is fast, simple, inexpensive and effective.

Steps ET1 to ET3 of said monitoring method are specified hereafter.

Step ET1 consists in computing an extrapolated position of the aircraft, for example, in 1, 2, . . . , 10 seconds, using the following data:

the current values of parameters (position, speed, etc.) of the aircraft showing the current status of the aircraft. These values must be confirmed by position monitoring (comparison of data from three sources to confirm whether or not the source used is correct);

a roll order (or roll command order) representing the guidance instruction for which validity is to be assessed;

the current values of atmospheric parameters (wind, altitude, temperature, etc.); and a common performance model of the aircraft.

In this step ET1, the monitoring, which is implemented by the monitoring unit 4A, 4B, considers that the aircraft is flying for a predetermined duration with a roll angle equal to the roll order provided by the considered flight management system.

Step ET2 consists in computing the track deviations E1 to E4 of the extrapolated positions, relative to the confirmed active segment SA of the flight plan.

Furthermore, step ET3 carries out an analysis of the extrapolated track deviation values. The evolution of the extrapolated track deviation values is analyzed in order to determine whether they diverge or converge in order to be able to detect and identify a defective flight management system. To this end, the various aforementioned analyses, implemented by the analysis modules M1 to M6, can be carried out.

Therefore, the flight management unit 1 is based on an architecture with two flight management systems 3A and 3B, implementing monitoring, in particular, of the computation of the guidance orders (or instructions). Monitoring of the guidance instructions generated by a flight management system 3A, 3B is based on an extrapolation of the position of the aircraft.

Furthermore, in a particular embodiment, each of the flight management systems 3A and 3B is configured to also carry out, in addition to establishing guidance instructions to lock the position of the aircraft on the path, the following computations:

a computation of the position of the aircraft;

a computation of the path of the aircraft; and a computation of the deviation between the position and the path of the aircraft.

Furthermore, in a particular embodiment, each of the monitoring units 4A and 4B can be configured to also carry out, in addition to monitoring the guidance orders (or instructions), the following monitoring of computations carried out by the flight management systems 3A and 3B:
monitoring a computation of a position of the aircraft;
monitoring an extraction of an RNP procedure from an NBD (Navigation Data Base) type database, the RNP procedure being stored in the navigation database of the flight management system, and loading the procedure in a flight plan; and
monitoring a path computation.

As shown in FIG. 1, each guidance chain 2A, 2B comprises a set 6A, 6B of common sensors for determining (measuring, computing, etc.) data ("DATA 1, 2"), namely the values of parameters associated with the status (position, speed, etc.) of the aircraft and with its environment (temperature, etc.). These values are provided via a link I1A, I1B from the set 6A, 6B to the corresponding flight management system 3A, 3B (with "corresponding" meaning that which belongs to the same guidance chain 2A, 2B).

Each flight management system 3A, 3B computes a position of the aircraft on the basis of values received from the corresponding set 6A, 6B of sensors. In the particular embodiment shown in FIG. 1, the flight management unit 1 also comprises an auxiliary unit 7 ("AUX"), which computes a third position on the basis of values received from the sets 6A and 6B via links I2A and I2B, respectively. This auxiliary unit 7 particularly can be used as a third data source with a view to a comparison and a vote in the monitoring unit 4A, 4B. This auxiliary unit 7 only carries out the indicated computations and operations and does not correspond to a (third) flight management system.

The monitoring unit 4A receives information from the flight management system 3A, from the flight management system 3B and from the auxiliary unit 7 via links I4A, I5B and I6A, respectively, and can provide the corresponding flight management system 3A with information via a link I7A. Similarly, the monitoring unit 4B receives information from the flight management system 3A, from the flight management system 3B and from the auxiliary unit 7 via links I5A, I4B and I6B, respectively, and can provide the corresponding flight management system 3B with information via a link I7B.

The monitoring of the position computation is implemented in the monitoring unit 4A, 4B (or in the flight management system 3A, 3B) by comparing and voting the positions provided by the two flight management systems 3A and 3B with the position provided by the auxiliary unit 7. Furthermore, each of the flight management systems 3A and 3B computes the guidance instructions (or orders) on the basis of the confirmed position and of the confirmed active segment of the flight plan and sends it to the monitoring unit 4A, 4B that monitors the evolution of the extrapolation of the position of the aircraft, derived from these guidance instructions, and invalidates the computation in the event of the detection of an anomaly by switching a monitoring status to invalid.

As shown in FIG. 1, each of the two guidance chains 2A and 2B of the flight management unit 1 comprises a guidance computer 8A, 8B ("FG 1, 2" for "Flight Guidance") connected to the flight management system 3A, 3B by a link I8A, I8B. One of said guidance computers 8A, 8B, namely the guidance computer of the active guidance chain, controls conventional servo-controls for the control surfaces of the aircraft in order to guide the aircraft in accordance with the guidance instructions. The selection logic (as a function of the monitoring status) between the guidance computer 8A and the guidance computer 8B for controlling the servo-controls and guiding the aircraft, is implemented on these guidance computers 8A and 8B in the conventional manner.

The flight management unit 1, as described above, therefore has an architecture based on two flight management systems 3A and 3B and monitoring (implemented by the monitoring units 4A and 4B in particular), including monitoring of the guidance instructions, in order to be able to implement operations of the RNP 0.1 type.

This architecture makes it possible to:
avoid having to install a third flight management system (to act as a third voting source), which would be expensive and complicated;
obtain a fast response time;
where necessary, identify a defective flight management system (in the event of the computation of erroneous guidance instructions), allowing the defective flight management system to be invalidated and the operation to continue on the remaining flight management system that is not faulty, and, if possible, the defective flight management system to be re-synchronized on the non-defective flight management system;
prevent the computation of a flight path by the monitoring device (which must be previously confirmed by an algorithm), by comparing the extrapolated position of the aircraft with the confirmed flight plan, and not with the flight path; and
prevent false alerts (or alarms), particularly during the transitions, by implementing the aforementioned monitoring operations (carried out by the analysis modules M1 to M6).

The invention claimed is:

1. A method for monitoring at least one guidance instruction provided by a flight management unit, said flight management unit comprising two guidance chains each provided with a flight management system, each of said flight management systems being configured to compute at least one guidance instruction for the aircraft,
wherein the method comprises the following successive steps:
a reception step, implemented by a reception unit, including receiving a guidance instruction to be monitored and at least the current position of the aircraft, the guidance instruction to be monitored representing the guidance instruction computed by one of said two flight management systems;
a first computation step, implemented by a first computation unit, including computing a plurality of positions, called extrapolated positions, of the aircraft, at least on the basis of said guidance instruction and said current position of the aircraft;
a second computation step, implemented by a second computation unit, including computing track deviations, called extrapolated deviations, corresponding to deviations of said extrapolated positions relative to an active segment of a flight plan followed by the aircraft; and
an analysis step, implemented by an analysis unit, including analyzing the extrapolated track deviations to determine whether the guidance instruction is a guidance instruction, called correct instruction, allowing the aircraft to converge toward the active segment of the flight plan, or a guidance instruction, called incorrect instruction, not allowing the aircraft to converge toward the active segment of the flight plan, the analysis step comprising a main sub-step comprising:

verifying whether the following three conditions are met:
    a first drift of the extrapolated track deviations is positive;
    a second drift of the extrapolated track deviations is positive; and
    the extrapolated positions are located on the same side of the active segment as the current position of the aircraft; and
concluding that the guidance instruction is incorrect if these three conditions are simultaneously met;
of invalidating the flight management system which computed the incorrect guidance instruction as being defective; and
of allowing operation of the flight management unit to continue on the other of said two flight management systems.

2. The method as claimed in claim 1,
wherein the analysis step comprises a first auxiliary sub-step including, during a transition between a first and a second successive active segment, for a roll anticipation distance:
    verifying whether at least one of the following two conditions is met:
    the drift of a current roll angle and the drift of a target roll angle have the same sign, the target roll angle being the sum of a nominal roll angle and a corrective term depending on the track deviation, the nominal roll angle being a roll angle relative to a segment of the current flight plan;
    the target roll angle being different from the nominal roll angle and the difference between the target roll angle and the nominal roll angle not varying, the current roll angle of the aircraft varies; and
    concluding that the guidance instruction is incorrect if one of these two conditions is met.

3. The method as claimed in claim 2,
wherein the analysis step comprises a second auxiliary sub-step including, during a transition between a first and a second successive active segment of the straight type:
    verifying whether the following condition is met: the track deviation relative to the second segment extrapolated at an extrapolation time does not decrease, the extrapolation time corresponding to an estimated time to the transition; and
    concluding that the guidance instruction is incorrect if this condition is met.

4. The method as claimed in claim 3,
wherein the analysis step comprises a third auxiliary sub-step including, during a transition between a first and a second successive active segment of the straight type:
    verifying whether the following condition is met: a speed vector of the aircraft is not orthogonal to a radius vector;
    concluding that the guidance instruction is incorrect if this condition is met.

5. The method as claimed in claim 4,
wherein the analysis step comprises a fourth auxiliary sub-step including, during a transition between a first and a second successive active segment of the straight type:
    verifying whether the following condition is met: the aircraft AC is not flying inside a containment zone depending on said first and second active segments;
    concluding that the guidance instruction is incorrect if this condition is met.

6. The method as claimed in claim 5,
wherein the analysis step comprises a fifth auxiliary sub-step including:
    verifying whether the following two conditions are met:
    conditions indicating that the guidance instruction is incorrect have been met at least during a predetermined number of successive processing operations; and
    the extrapolated track deviation is greater than a predetermined value; and
    concluding that the guidance instruction is incorrect only if these two conditions are simultaneously met.

7. The method as claimed in claim 1,
wherein the first computation step includes computing an extrapolated position of the aircraft using the following data:
    the values of parameters of the aircraft, including at least the current position, previously confirmed, showing a status of the aircraft;
    a roll order representing the guidance instruction to be monitored;
    the current value of at least one atmospheric parameter; and
    a performance model of the aircraft.

8. A device for monitoring at least one guidance instruction provided by a flight management unit, said flight management unit comprising two guidance chains each provided with a flight management system, each of said flight management systems being configured to compute at least one guidance instruction for the aircraft,
wherein the device comprises:
    a reception unit configured to receive a guidance instruction to be monitored and at least the current position of the aircraft, the guidance instruction to be monitored representing the guidance instruction computed by one of said two flight management systems;
    a first computation unit configured to compute a plurality of positions, called extrapolated positions, of the aircraft, at least on the basis of said guidance instruction and said current position of the aircraft;
    a second computation unit configured to compute track deviations, called extrapolated deviations, corresponding to deviations of said extrapolated positions relative to an active segment of a flight plan followed by the aircraft; and
    an analysis unit configured to analyze extrapolated track deviations in order to determine whether the guidance instruction is a guidance instruction, called correct instruction, allowing the aircraft to converge toward the active segment of the flight plan, or a guidance instruction, called incorrect instruction, not allowing the aircraft to converge toward the active segment of the flight plan, the analysis unit comprising a main analysis module configured to:
    verify whether the following three conditions are met:
        a first drift of the extrapolated track deviations is positive;
        a second drift of the extrapolated track deviations is positive; and
        the extrapolated positions are located on the same side of the active segment as the current position of the aircraft; and
    conclude that the guidance instruction is incorrect if these three conditions are simultaneously met;
    wherein the device is configured to:

invalidate the flight management system which computed the incorrect guidance instruction as being defective; and allow operation of the flight management unit to continue on the other of said two flight management systems.

9. The device as claimed in claim 8, wherein the analysis unit comprises at least one auxiliary analysis module.

10. A flight management unit for an aircraft, said flight management unit comprising two guidance chains each provided with a flight management system, each of said flight management systems being configured to carry out at least one computation of guidance instructions for the aircraft, said flight management unit further comprising at least one monitoring unit configured to monitor data generated by the flight management systems, wherein the monitoring unit comprises a monitoring device as claimed in claim 8.

11. An aircraft comprising a monitoring device as claimed in claim 8.

12. An aircraft comprising a flight management unit as claimed in claim 10.

* * * * *